(12) United States Patent
Chickering et al.

(10) Patent No.: US 9,120,017 B2
(45) Date of Patent: *Sep. 1, 2015

(54) ARRANGEMENT FOR BUILDING AND OPERATING HUMAN-COMPUTATION AND OTHER GAMES

(75) Inventors: David M. Chickering, Bellevue, WA (US); Edith Law, Pittsburgh, PA (US); Anton Mityagin, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 632 days.

This patent is subject to a terminal disclaimer.

(21) Appl. No.: 13/368,848

(22) Filed: Feb. 8, 2012

(65) Prior Publication Data

US 2012/0135809 A1    May 31, 2012

Related U.S. Application Data

(62) Division of application No. 12/351,564, filed on Jan. 9, 2009, now Pat. No. 8,137,201.

(51) Int. Cl.
  *G06F 17/00* (2006.01)
  *A63F 13/40* (2014.01)

(52) U.S. Cl.
  CPC .......... *A63F 13/10* (2013.01); *A63F 2300/6009* (2013.01)

(58) Field of Classification Search
  CPC .............. G07F 17/3272; A63F 2300/5533; A63F 9/24; A63F 13/10; A63F 2300/6009
  USPC ............................................. 715/237; 463/42
  See application file for complete search history.

(56) References Cited

U.S. PATENT DOCUMENTS

| | | | |
|---|---|---|---|
| 6,210,272 B1 * | 4/2001 | Brown .............................. | 463/1 |
| 6,315,668 B1 * | 11/2001 | Metke et al. .................... | 463/42 |
| 7,133,927 B2 * | 11/2006 | Guo et al. ....................... | 709/234 |
| 7,533,812 B2 | 5/2009 | Kumar et al. | |
| 7,646,914 B2 * | 1/2010 | Clausi et al. ................... | 382/187 |
| 8,046,683 B2 | 10/2011 | Larcheveque et al. | |
| 8,072,950 B2 * | 12/2011 | Fan et al. ....................... | 370/338 |
| 8,613,673 B2 * | 12/2013 | Perry et al. ...................... | 463/42 |
| 8,647,188 B2 * | 2/2014 | Kelly et al. ..................... | 463/20 |
| 8,660,675 B2 * | 2/2014 | Kelly et al. ..................... | 700/92 |
| 8,727,892 B1 * | 5/2014 | Chun .............................. | 463/42 |
| 8,734,254 B2 * | 5/2014 | Aguilar et al. .................. | 463/42 |

(Continued)

OTHER PUBLICATIONS

Rhalibi et al., 3D Java Web-Based Games Development and Deployment, IEEE 2009, pp. 1-7.*

(Continued)

*Primary Examiner* — Cong-Lac Huynh
(74) *Attorney, Agent, or Firm* — Steven Spellman; Jim Ross; Micky Minhas

(57) ABSTRACT

A game description language is provided for human computation games, as well as a game platform or generator component that can generate the code base for the game. The game description language and schema framework can be used to represent the game logic and synchronization patterns of a human computation game. The automated code generation tool takes a file, e.g., a file made from the above game description language, or the like, as an input and generates a code base for the corresponding human computation game. These tools allow a prototype of a human computation game to be generated within minutes.

16 Claims, 22 Drawing Sheets

(56) References Cited

U.S. PATENT DOCUMENTS

| | | |
|---|---|---|
| 8,734,259 B2* | 5/2014 | Evans et al. .................... 463/42 |
| 8,827,810 B2* | 9/2014 | Weston et al. .................. 463/39 |
| 2005/0071477 A1* | 3/2005 | Evans et al. ................... 709/228 |
| 2006/0183526 A1* | 8/2006 | Verardi et al. ................. 463/13 |
| 2006/0287099 A1* | 12/2006 | Shaw et al. .................... 463/42 |
| 2008/0147422 A1* | 6/2008 | Van Buskirk ................... 705/1 |
| 2008/0250914 A1* | 10/2008 | Reinhart et al. ............... 84/645 |
| 2009/0215512 A1* | 8/2009 | Gannon et al. ................. 463/16 |
| 2009/0327094 A1* | 12/2009 | Elien et al. .................... 705/26 |
| 2010/0087241 A1* | 4/2010 | Nguyen et al. ................. 463/17 |
| 2010/0267448 A1* | 10/2010 | Snoddy et al. ................. 463/30 |
| 2011/0244957 A1* | 10/2011 | Nishimura et al. ............ 463/31 |
| 2012/0254807 A1* | 10/2012 | Evans et al. .................... 715/835 |
| 2014/0189513 A1* | 7/2014 | Dua ............................... 715/716 |
| 2015/0065241 A1* | 3/2015 | McCarthy ....................... 463/31 |
| 2015/0065243 A1* | 3/2015 | Mizrahi et al. ................. 463/31 |
| 2015/0118671 A1* | 4/2015 | Hao et al. ....................... 434/353 |

OTHER PUBLICATIONS

Ravid et al., Multiplayer, Internet and Java-based Simulation Games: Learning and Research in Implementing a Computerized Version of the "Beer-Distribution Supply Chain Game", Google 2000, pp. 1-6.*

* cited by examiner

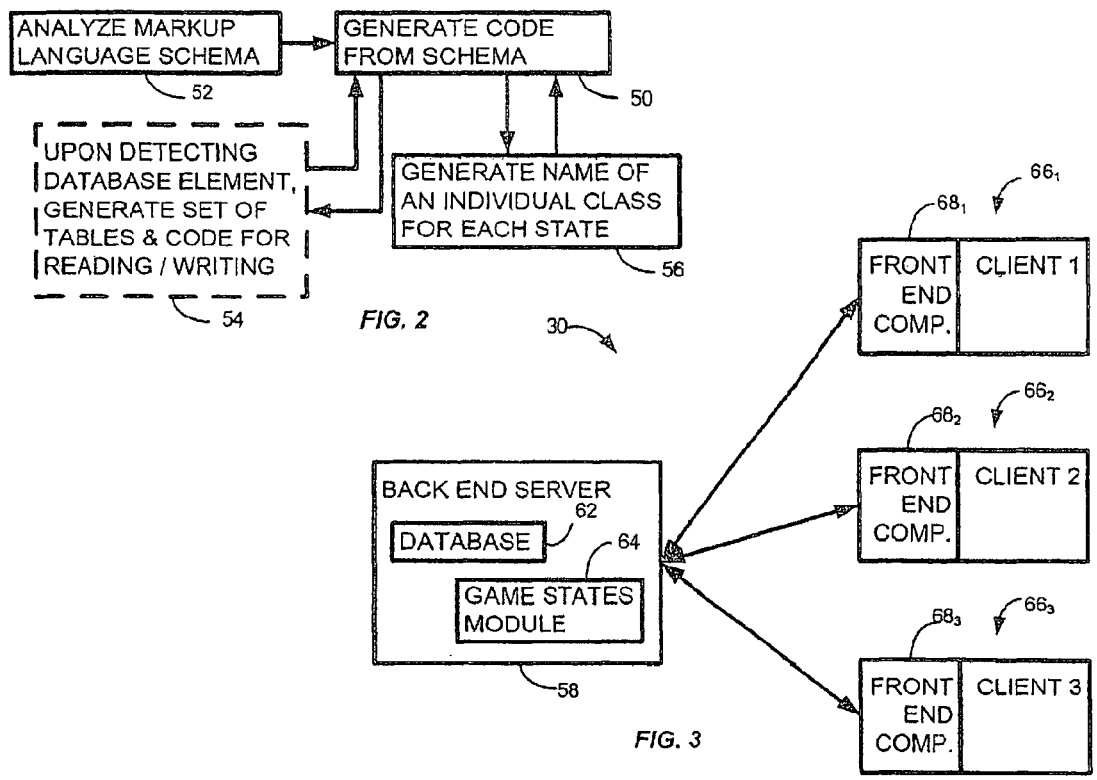

```
<!--Simple types--> <xs:simpleType name="EventType">
  <xs:restriction base="xs:string">
    <pattern value=
      "(InterfaceEvent|    131a
      GameEvent|    131b
      ConditionCheckerEvent:(all|    131c
                  atleast_[0-9]+|
                  atmost_[0-9]+|
                  exactly_[0-9]+|
                  custom)
                  =[a-zA-Z]+"/>
  </xs:restriction>
</xs:simpleType>

<simpleType name='OnEnterType'>
  <restriction base='xs:string'>
    <pattern value="sendevent_all=[a-zA-Z]+|
        sendevent_explicit)=([a-zA-Z]+:[a-zA-Z]+);+"/>
  </restriction>
</simpleType>

<simpleType name='InterfacePanelType'>
  <restriction base='xs:string'>
    <enumeration value="PreGamePanel"\>
    <enumeration value="GamePanel"\>
    <enumeration value="PostGamePanel"\>
  </restriction>
</simpleType>

<!--elements--><xs:element name="game_time" type="xs:int"/>
</xs:element name="number_of_players" type="xs:int"/><xs:element
name="dataSource" type="xs:string"/><xs:element name="dbUserID"
type="xs:string"/><xs:element name="dbUserPassword"
type="xs:string"/><xs:element name="event" type="xs:string"/>
<xs:element name="eventType" type="xs:EventType"/><xs:element
name="target" type="xs:string"/><xs:element name="onEnter"
type="xs:OnEnterType"/>

<!--attributes--><xs:attribute name="initial" type="xs:string"/>
<xs:attribute name="id" type="xs:string"/><xs:attribute
name="display" type="xs:InterfacePanelType"/>

<!--definition of complex elements--><xs:element
name="transition">
  <xs:complexType>
    <xs:sequence>         148
      <xs:element ref="event"/>
      <xs:element ref="eventType"/>
      <xs:element ref="target"/>
    </xs:sequence>
  </xs:complexType>
</xs:element>

<xs:element name="player_state">
  <xs:complexType>         146
    <xs:sequence>
      <xs:element ref="transition" minOccurs="0" maxOccurs="unbounded"/>
    </xs:sequence>
    <xs:attribute ref="id" use="required"/>
    <xs:attribute ref="display" use="required"/>
  </xs:complexType>
</xs:element>
```

FIG. 5

```xml
<xs:element name="game_state">
  <xs:complexType>                              ← 144
    <xs:sequence>
      <xs:element ref="transition" minOccurs="0" maxOccurs="unbounded"/>
    </xs:sequence>
    <xs:attribute ref="id" use="required"/>
    <xs:attribute ref="onEnter" use="required"/>
  </xs:complexType>
</xs:element>

<xs:element name="player_states">
  <xs:complexType>                              ← 142
    <xs:sequence>
      <xs:element ref="player_states" minOccurs="1" maxOccurs="unbounded"/>
    </xs:sequence>
    <xs:attribute ref="initial" use="required"/>
  </xs:complexType>
</xs:element>

<xs:element name="game_states">
  <xs:complexType>                              ← 138
    <xs:sequence>
      <xs:element ref="game_states" minOccurs="1" maxOccurs="unbounded"/>
    </xs:sequence>
    <xs:attribute ref="initial" use="required"/>
  </xs:complexType>
</xs:element>

<xs:element name="database">
  <xs:complexType>                              ← 136
    <xs:sequence>
      <xs:element ref="dataSource" use="required"/>
      <xs:element ref="dbUserID" use="required"/>
      <xs:element ref="dbUserPassword" use="required"/>
    </xs:sequence>
  </xs:complexType>
</xs:element>

<!--The main game element--><xs:element name="game">    ← 134
  <xs:complexType>
    <xs:sequence>
      <xs:element ref="number_of_players" use="required"/> ← 134a
      <xs:element ref="game_time" use="required"/> ← 134b
      <xs:element ref="database"/> ← 134c
      <xs:element ref="player_states" use="required"/> ← 134d
      <xs:element ref="game_states" use="required"/> ← 134e
    </xs:sequence>
  </xs:complexType>
</xs:element>
```

FIG. 5 (CONT.)

```xml
<player_states initial="Unconnected">

<state id="Unconnected" display="myPreGamePanel">
    <transition>
      <event>ClickPlay</event>
      <eventType>InterfaceEvent</eventType>       ← 178
      <target>Connecting</target>
    </transition>
  </state>

<state id="Connecting" display="myPreGamePanel">
    <transition>
      <event>ProceedToPlaying</event>
      <eventType>GameEvent</eventType>            ← 176
      <target>Playing</target>
    </transition>
  </state>

<state id="ReviewingImage" display="myGamePanel">
    <transition>
      <event>Tag</event>
      <eventType>InterfaceEvent</eventType>
      <target>Playing</target>                    ← 174
    </transition>
    <transition>
      <event>ProceedToReviewRoundResult</event>
      <eventType>GameEvent</eventType>
      <target>ReviewRoundResult</target>
    </transition>
    <transition>
      <event>ProceedToGameOver</event>
      <eventType>GameEvent</eventType>
      <target>GameOver</target>
    </transition>
  </state>

<state id="ReviewRoundResult" display="myGamePanel">
    <transition>
      <event>Proceed</event>
      <eventType>InterfaceEvent</eventType>       ← 172
      <target>WaitingToProceed</target>
    </transition>
    <transition>
      <event>ProceedToGameOver</event>
      <eventType>GameEvent</eventType>
      <target>GameOver</target>
    </transition>
  </state>

<state id="WaitingToProceed" display="myGamePanel">
    <transition>
      <event>ProceedToReviewImage</event>
      <eventType>GameEvent</eventType>            ← 168
      <target>ReviewingImage</target>
    </transition>
    <transition>
      <event>ProceedToGameOver</event>
      <eventType>GameEvent</eventType>
      <target>GameOver</target>
    </transition>
  </state>
```

```
<state id="GameOver" display="myPostGamePanel">
  <transition>
    <event>ClickPlay</event>
    <eventType>InterfaceEvent</eventType>
    <target>Connecting</target>
  </transition>
</state>

</player_states>
```
← 166

FIG. 8 (CONT.)

```xml
<game_states initial="Matching">

<state id="Matching">
    <transition>
      <event>AllPlayersJoined</event>
      <eventType>ConditionCheckerEvent:all=Connecting</eventType>
      <target>RoundStart</target>
    </transition>                              ← 212
    <transition>
      <event>TimeOut</event>
      <eventType>GameEvent</eventType>
      <target>End</target>
    </transition>
  </state>

<state id="RoundStart" onEnter="sendevent_all=ProceedToPlaying">
    <transition>
      <event>AllPlayersVoted</event>
      <eventType>ConditionCheckerEvent:custom=IsTagMatched</eventType>
      <target>RoundEnd</target>
    </transition>                              ← 208
    <transition>
      <event>TimeOut</event>
      <eventType>GameEvent</eventType>
      <target>End</target>
    </transition>
  </state>

<state id="RoundEnd" onEnter="sendevent_all=ProceedToReviewRoundResult">
    <transition>
      <event>AllPlayersReadyToProceed</event>
      <eventType>ConditionCheckerEvent:all=WaitingToProceed</eventType>
      <target>RoundStart</target>
    </transition>                              ← 206
    <transition>
      <event>TimeOut</event>
      <eventType>GameEvent</eventType>
      <target>End</target>
    </transition>
  </state>

<state id="End" onEnter="sendevent_all=ProceedToGameOver">
    <transition>                               ← 204
      <event>AllPlayersVoted</event>
      <eventType>ConditionCheckerEvent:all=Connecting</eventType>
      <target>RoundStart</target>
    </transition>
  </state>

</game_states>
```

| FIELD | TYPE |
|---|---|
| ID | INT |
| QUERIES | CHAR(100) |
| DIFFICULTY | CHAR(100) |

| | |
|---|---|
| ID | INT |
| GAME_ID | INT |
| ROUND_NUMBER | INT |
| PLAYER_IDS | CHAR(100) |

| | |
|---|---|
| ID | INT |
| ROUND_ID | INT |
| PLAYER_ID | STRING |
| ACTION_TYPE | STRING |
| ACTION_VALUE | STRING |
| TIME-ELAPSED | STRING |

FIG. 12(C)

ARRANGEMENT FOR BUILDING AND OPERATING HUMAN-COMPUTATION AND OTHER GAMES

CROSS REFERENCE TO RELATED APPLICATIONS

This application is a divisional application of U.S. patent application Ser. No. 12/351,564, which was filed on Jan. 9, 2009 and is now allowed, the entire disclosure of which is hereby incorporated by reference.

BACKGROUND

Many web-search systems require human-labeled data. One human-labeling task used to build web-search systems has people judge the relative relevance of web pages for a particular search query. The resulting data allows a wide variety of machine-learning algorithms to be applied to construct ranking systems for search. Other human-labeling tasks relevant to building web-search systems include labeling web pages for spam content, labeling the intent of search queries, labeling whether a particular search query is relevant to a certain domain, e.g. entertainment or medicine, and labeling entities in a query or web page, e.g., noting that a word corresponds to a particular actor or product.

System designers often collect human-labeled data either by hiring professionals to manually label the data or through more indirect methods such as collecting click logs or examining the search history from users' browsers. As an example of the last approach, Google®, Microsoft®, and Yahoo!® all provide search toolbars that record users' clicks and page visits. Although this approach yields a large amount of data, the data is often not easily applicable to the system-building task at hand. Hiring professionals, on the other hand, can be time consuming and costly.

Human-computation games engage players in an enjoyable activity where the players are simultaneously performing a useful data-labeling task. After incurring the initial software-development costs, such data-collection methods result in essentially free human-supplied labels, and a popular web game can generate data very quickly.

The first human-computation game to gain wide-spread popularity was the ESP Game, in which two players are shown the same image and are asked to type descriptions for that image. Several years since its deployment, the game is still being played, generating tags for images on a daily basis. Since then, many human computation games have been developed to collect data about music, images, and for extracting facts and knowledge to power the semantic web.

Human-computation games often use partner agreement to ensure data quality; for example, if two strangers playing the ESP game provide the same description to an image, it is likely that the description is a good one. In order to take advantage of partner agreement, a human-computation game generally requires multiple players, which in turn requires synchronization and online communication between the players. This requirement inherently means that such games employ a complex server-client infrastructure where the game server keeps track of the states of all simultaneous games and frequently interacts with all active player clients. Thus, developing human-computation games is time-consuming, with typical development times in the order of months.

Another important feature of a human-computation game is that the game be fun and engaging. It is often difficult, however, to ascertain whether the game is fun or how users will behave until the game is deployed and tested by users. As a result, fast prototyping is important. If prototypes can be created in a matter of minutes or hours, overall development time can be greatly shortened and a tighter, more informative feedback loop in the game research process will ensue.

Finally, it is noted that many human-computation games share several commonalities, especially with respect to generalizable game mechanisms and the need for player synchronization.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Arrangements are described for fast prototyping of human-computation games. The arrangements include two components—a game description language and schema framework that can be used to represent the game logic and synchronization patterns of a human computation game, and an automated code generation tool which takes a file, e.g., a file made from the above game description language, or the like, as an input and generates a code base for the corresponding human computation game. Together, these tools allow a prototype of a human computation game to be generated within minutes. To illustrate the applicability of the arrangement, four examples of prototype games are described that were created using the framework, these prototype games particularly applicable to collect data for various search applications. The description language is general, but may be particularly beneficial for web-based human-computation games, and the same addresses many issues faced by these games. These issues include database support, bots and synchronization of player states during the game.

The game description language is described in the context of an XML-based language, here termed "HCXML". The generator component is termed "HCGen". It should be noted that the language need not be XML-based, and HCGen may take any suitable language as an input.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 2 illustrates steps in the arrangement for building human computation games.

FIG. 3 illustrates a network layout that may be employed in the arrangement for building human computation games.

FIG. 5 illustrates a schema that may be employed in the arrangement for building human computation games.

FIG. 8 illustrates an exemplary players state representation that may be employed in the schema for the arrangement for building human computation games.

FIG. 10 illustrates an exemplary game states representation that may be employed in the schema for the arrangement for building human computation games.

FIG. 11(A) is a solution in Visual Studio®; FIG. 11(B) shows autogenerated player and game states; and FIG. 11(C) shows a custom folder and its contents.

FIGS. 12(A)-(C) illustrate exemplary database tables for queries (A), rounds (B), and recordings (C).

FIG. 13(A) shows a 'welcome' page, while FIG. 13(B) shows a score, timer, and debug panel.

Corresponding reference characters indicate corresponding parts throughout the drawings.

DETAILED DESCRIPTION

Arrangements are provided for building human computation games in a rapid and convenient manner. The arrangements employ commonalities among human computation games that are captured in two components—a schema framework and language (HCXML) and a code generation tool (HCGen).

Figure 1:
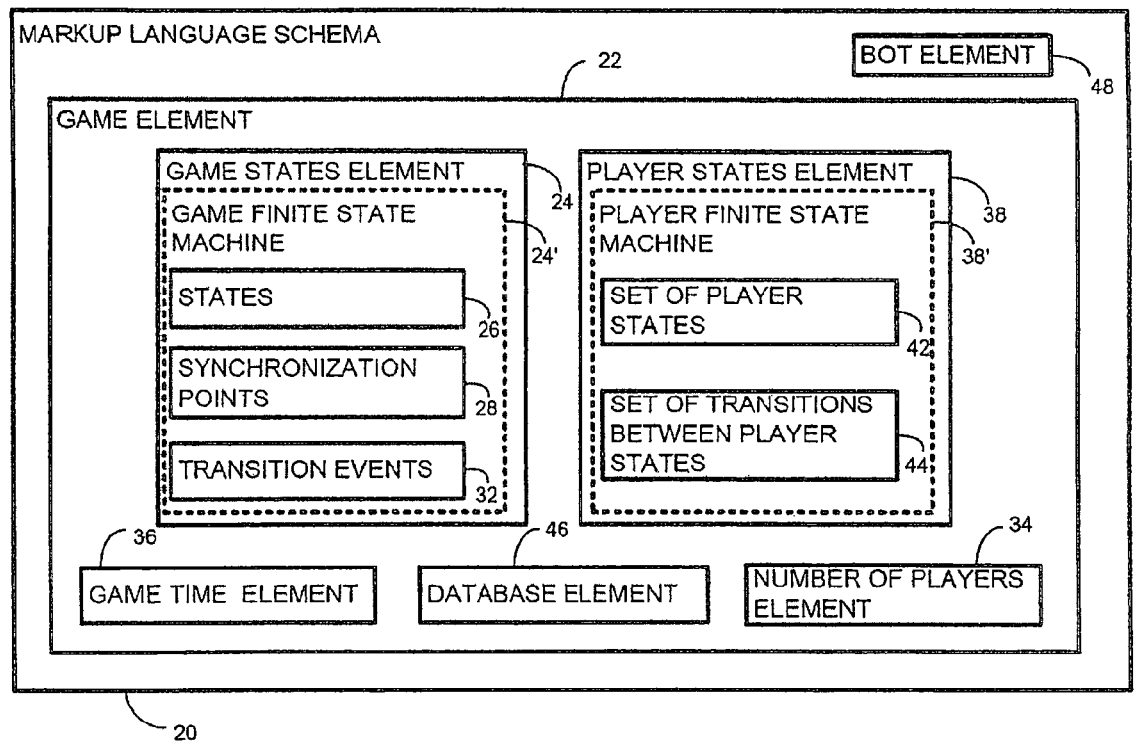
FIG. 1 illustrates aspects of a markup language schema that may be employed in an arrangement for building human computation games.

Referring to FIG. 1, aspects of a markup language schema 20 are illustrated, the schema 20 for building human computation games. The schema includes a game element 22 that further includes a game states element 24 and a player states element 38. The game states element 24 specifies a game states machine 24' and further includes a states element 26, a synchronization points module 28, and a transition events module 32. The player states element 38 specifies a player states machine 38' and further includes an element 42 corresponding to a set of player states and an element 44 corresponding to a set of transitions between player states.

The player state machine 38' includes a set of player states, each of which generally corresponds to a user-interface screen that players encounter during a game. The player state machine 38' also includes a set of events that cause transitions between player states, each of which generally corresponds to a change in the user-interface screen.

The game finite-state machine 24' includes a set of game states, each of which corresponds to a union of all players' states, as well as a set of events that causes transitions between game states. The game-state machine 24' is a useful mechanism for synchronizing players' actions.

The game element 22 may also include other elements, such as a game time element 36, a database element 46, and a 'number of players' element 34. The schema may include a bot element 48, which may be employed to, e.g., act as an opponent against a human player in a human computation game, if such additional player is needed. Other details of these elements will be described in greater detail below.

FIG. 2 illustrates steps in an arrangement for generating code for a human computation game from a schema 20 such as that described above. A first step is to analyze the created markup language schema (step 52). A next step is to generate code from the schema (step 50). In so doing, a name of an individual class is generated for each state described in the schema (step 56). In some cases, a database element is detected, and in these cases a set of tables and code for reading from and writing to the tables are also generated (step 54). It is noted that not all cases employ databases, and thus this is an optional step and is shown in dotted lines.

FIG. 3 illustrates a network layout 30 that may be employed in the arrangement for building human computation games. A back-end server 58 houses, among other modules, a game states module 64 and an optional database 62. The back-end server 58 may be the same as the game server, on which, e.g., a game engine resides, or may be a separate server. The back-end server 58 communicates with a plurality of clients $66_1$-$66_3$, with corresponding front-end components $68_1$-$68_3$. Of course, in a given arrangement, any number of clients may be employed.

The back end server 58 may run on a central server and generally keeps track of all simultaneous games, as well as communicating with all instances of the front end components $68_1$-$68_3$. The front-end component is a user interface component that runs in the client web browser, rendering the user interface, responding to player actions, and communicating with the game server and/or back end server 58.

Figure 4:
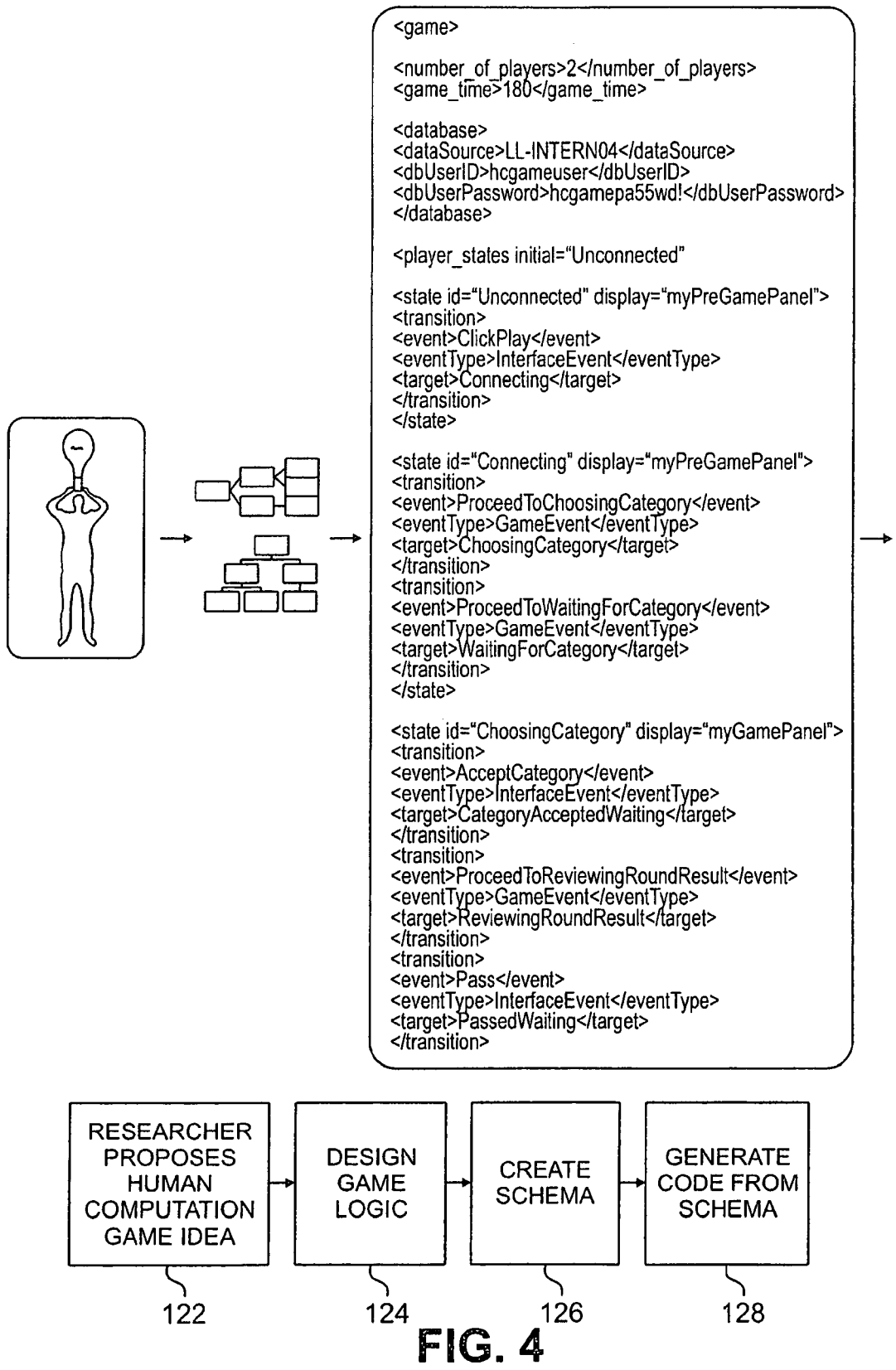
FIG. 4 illustrates a usage scenario in the arrangement for building human computation games.
Figure 4:
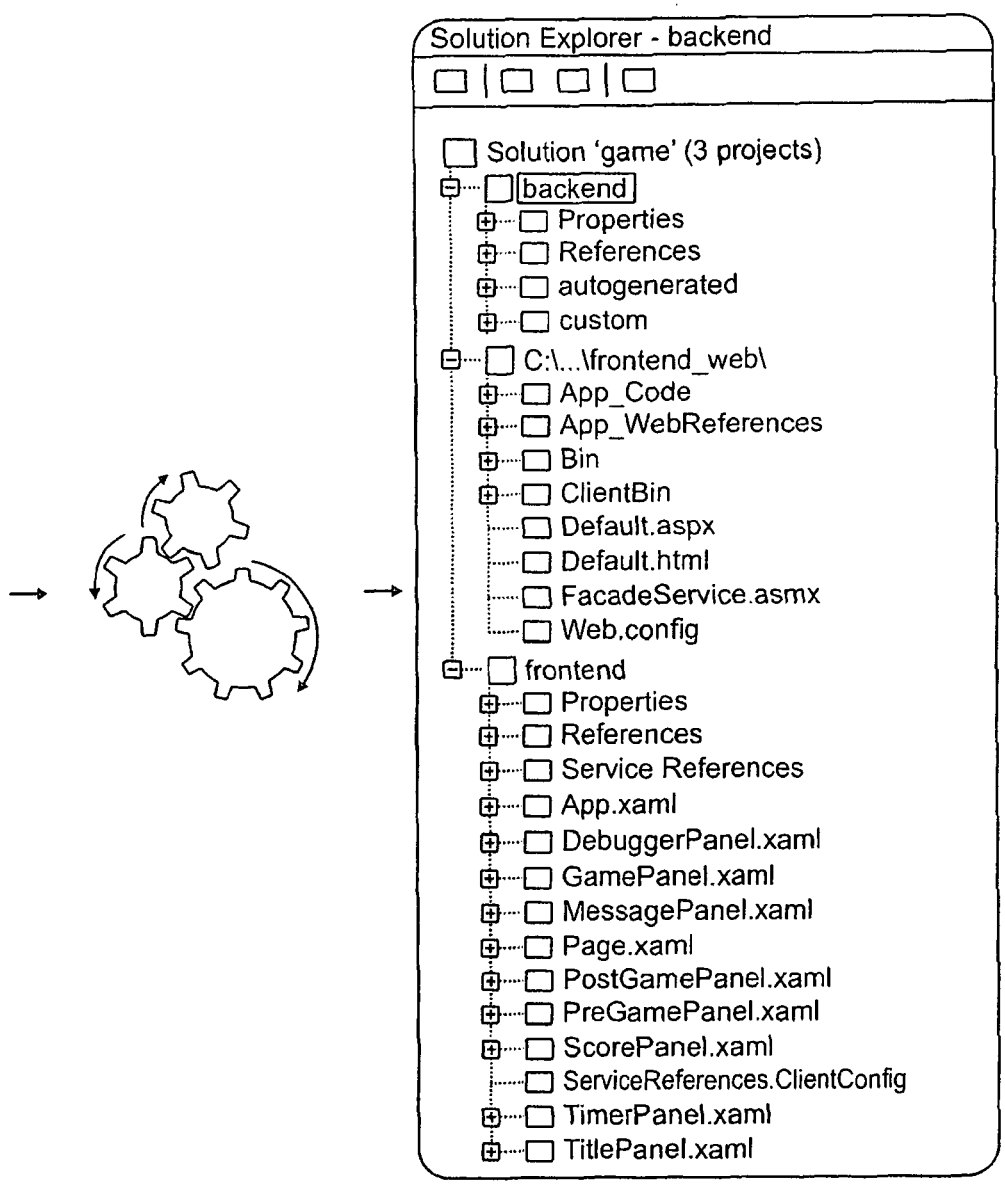

A usage scenario of the arrangement is illustrated in FIG. 4. First, a researcher develops an idea for a game that will collect data that is useful for his or her particular problem (step 122). Based on this idea, the researcher describes the game logic (step 124) using a meta-language of game states, which are roughly equivalent to game screens, as well as state transitions, which represent game actions. A game state diagram is developed that describes the logic of the game and can be represented (step 126) using, e.g., XML in an HCXML file. Next, the game-generation tool takes the HCXML file as input and generates the code base (step 128) for the human-computation game. Finally, the researcher completes development of the game by implementing the user interface.

It is generally important to synchronize actions of multiple simultaneous players participating in the game. This issue may be particularly challenging because most programming languages for implementing game user interfaces in client browsers, e.g., Flash, Silverlight and AJAX, only offer unidirectional communication with the game server. The present arrangement, by contrast, presents a general way to specify the logic of a game by means of game states and transitions and which in many cases employ multi-directional communication.

FIG. 5 illustrates a schema 130 of the HCXML format. The main game element 134 includes five parameters: number_of_players 134a, game_time 134b, database 134c, player_states 134d, and game_states 134e.

The number_of_players element 134a specifies the number of players for each game. The game_time element 134b specifies the amount of time before the game is over. From this specification, code may be automatically generated to dispatch a GameEvent_TimeOut when the game timer runs out, the code also causing a transition to an appropriate state.

The database element 136 with reference 134c is optional and includes the dataSource, dbUserID, and dbUserPassword fields. Upon detecting this element, the generator component may generate a set of generic tables, discussed below, and may further automatically generate code for reading from and writing to these tables during the game. Users may also customize their own database functionalities. For example, they may decide to read and write from a text file or other sort of file instead.

Finally, the schema format captures the game logic by means of the two state machines, the player finite state machine 38' and a game finite state machine 24' (see FIG. 1), which are specified in a player_states element 142 and in a game_states element 138. This state-machine representation is also scalable, i.e. the schema is capable of generating many types of human-computation games with an arbitrary number of players.

Reviewing the schema in FIG. 5, the player-state machine 38' and the game-state machine 24' include a set of states 146 and 144, respectively, each with an id 146' and 144', respectively, that will become a name of an individual class in the auto-generated code. Each state can contain a number of transitions 146" and 144", each transition signaling a user interface change. A transition (element 148) is triggered by an event of a certain eventType 148', which when executed, results in a state change to the target state.

There are in general three event types: (a) InterfaceEvent 131a, which originates from the front end component $68_i$; (b) GameEvent 131b, which originates from the game-state machine or anywhere else in the back-end server 58; and (c) ConditionCheckerEvent 31c, which originates from the game state machine 24', and is triggered when a certain condition is met.

ConditionCheckerEvent 131c may play a role in the automatic synchronization of player states in the game state machine 24'. When a player performs an action on the front-end component $68_i$, an InterfaceEvent 131a is sent to the back end server 58. In turn, the back-end server 58 uses the player state machine 38' to determine which transition to apply. Finally, the back end server 58 informs the front-end component $68_i$ of player state changes. The front-end component $68_i$ then renders the corresponding user interface change on the player's screen.

Additionally, the game state machine 24' uses condition checking to enforce synchronization between the players. Immediately after each player's action, a condition check is performed to determine if a combination of players' states satisfies a pre-specified condition. If the condition is satisfied, a ConditionCheckerEvent is fired to transition to the target game state.

The schema may specify how the condition is checked. For example, a set of auto-generated boolean functions may be employed, each of which takes a set of player states as an input and outputs true or false depending on whether the particular combination of player states satisfies a state-transition condition. These boolean functions can be specified directly in the HCXML file.

For example, X may be a particular player state id. The boolean functions check if all (all=X), at least n (atleast_[0-9]+=X), at most n (atmost_[0-9]+=X), or exactly n (exactly_[0-9]+=X) player states match a particular player state id. Users also have the option of specifying their own custom (custom=X) boolean function for detecting a more complicated condition.

When a condition is met and the target game state is reached, all players are synchronized to the player states associated with that target game state. The HCXML format may specify how this synchronization happens. Each game state may have an on Enter attribute that specifies what player state to transition to for each player. If X is the particular player state id, the game state machine can send an event to all players (sendevent_all=X) to transition to state X. Alternatively, for the case of asymmetric games, the game state machine may transition players to a different state depending on their current role in the game. This may be performed by specifying sendevent_explicit=Y in the on Enter attribute, where Y is a semi-colon separated list of player state identifiers.

To illustrate how to represent a game using HCXML, a standard game of ESP is employed as a running example. To implement games in other languages, an analogous sequence of steps may be performed. A first step is to diagram a sequence of screens players encounter during the game.

Figure 6A:
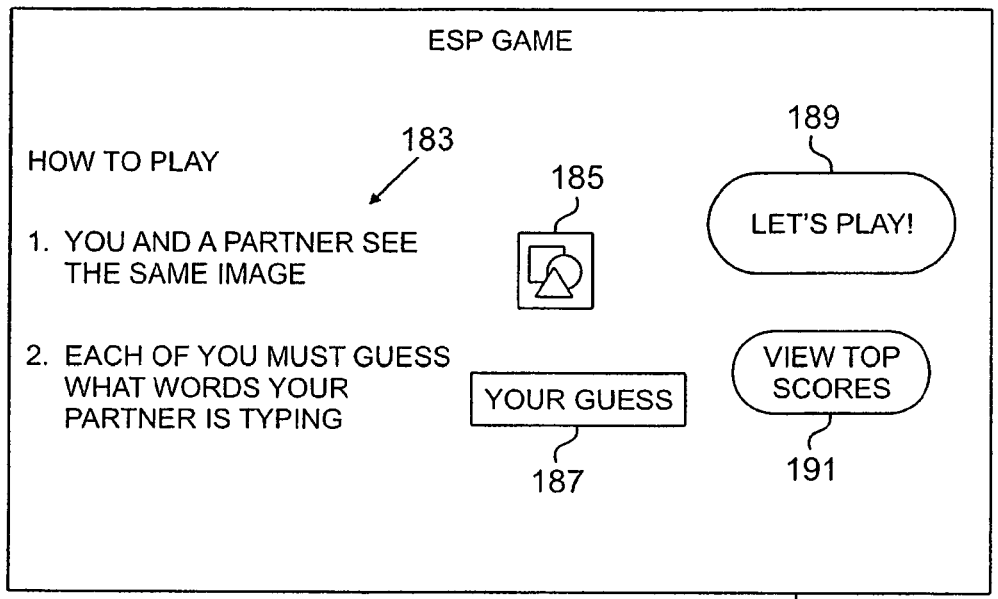
FIGS. 6(A)-(E) illustrate a partial set of exemplary screenshots, e.g., player states or stages of play, that may be encountered by a user playing a human computation game, in this case an "ESP" game, built by the arrangement.
Figure 6B:
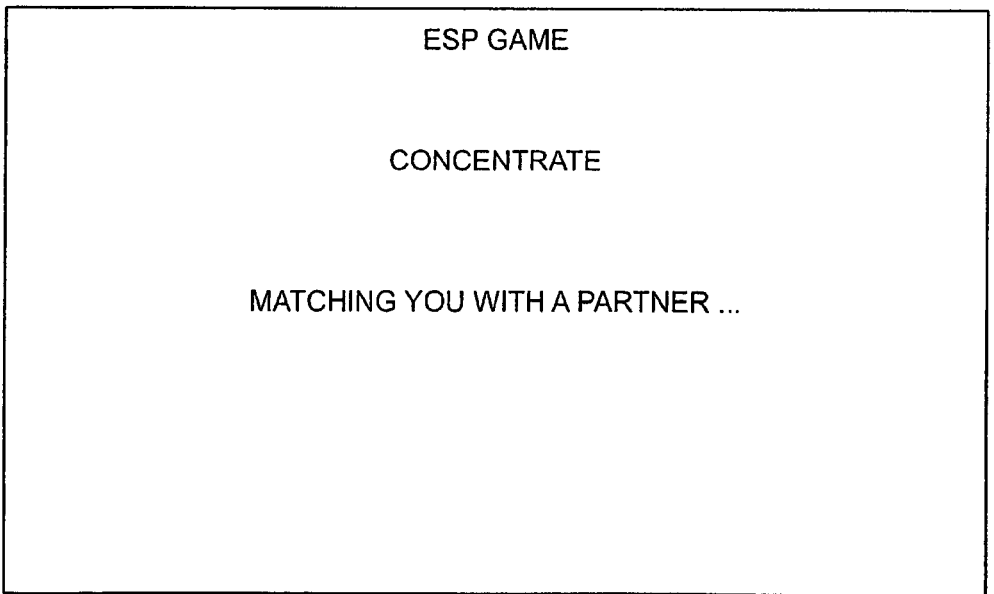

Referring to FIG. 6(A), a player may initially view a welcome screen 182, which may provide instructions 183, an exemplary image 185, a guess field 187, and a top score link 191. At this point, the player is unconnected with any partners. The player clicks a play button 189 to start the game. Upon clicking the play button 189, the player is shown a message notifying him or her that the system is connecting with one or more partners (screen 184 of FIG. 6(B)).

Figure 6C:
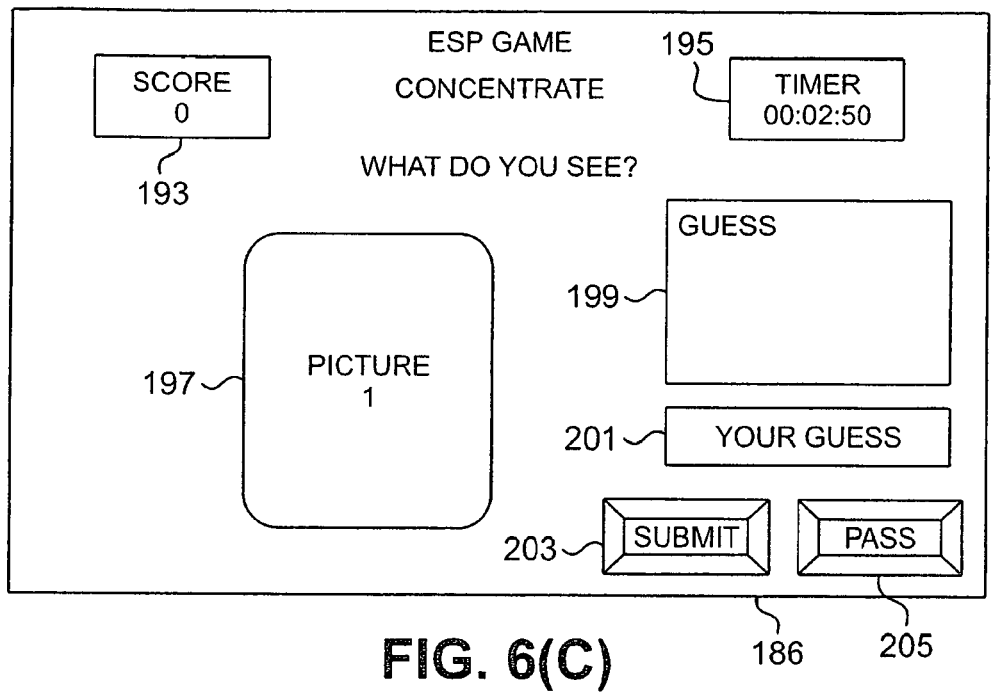

Referring to FIG. 6(C), after connecting with a partner, and in each round in the game, the player is presented with an image 197 on a screen 186 and can type any keywords that describe that image in a field 201. A timer 195 can be provided as well as a score display 193. A display 199 may be provided to allow the player to view their prior guesses. A submit button 203 is employed to enter a guess, while a pass button 205 is employed if the player wishes to move to the next image.

Figure 6D:
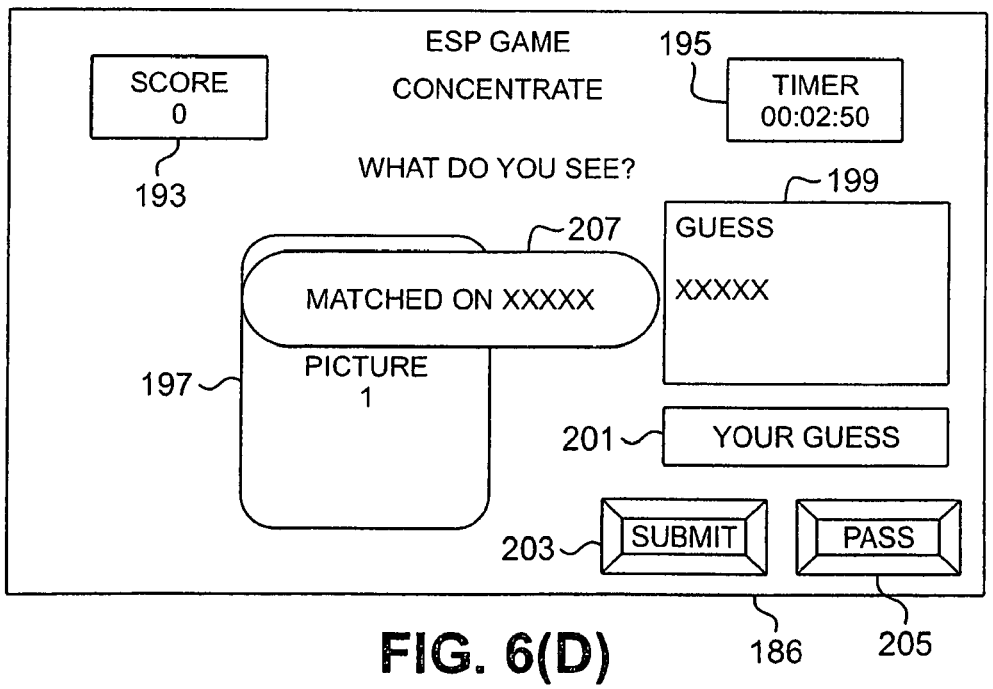

When both players match on any of their keywords, e.g., word "XXXXX" in FIG. 6(D), the round completes and the players are shown the round result 207. After being given a sufficient amount of time to review the round result, the players move to the next round.

Figure 6E:
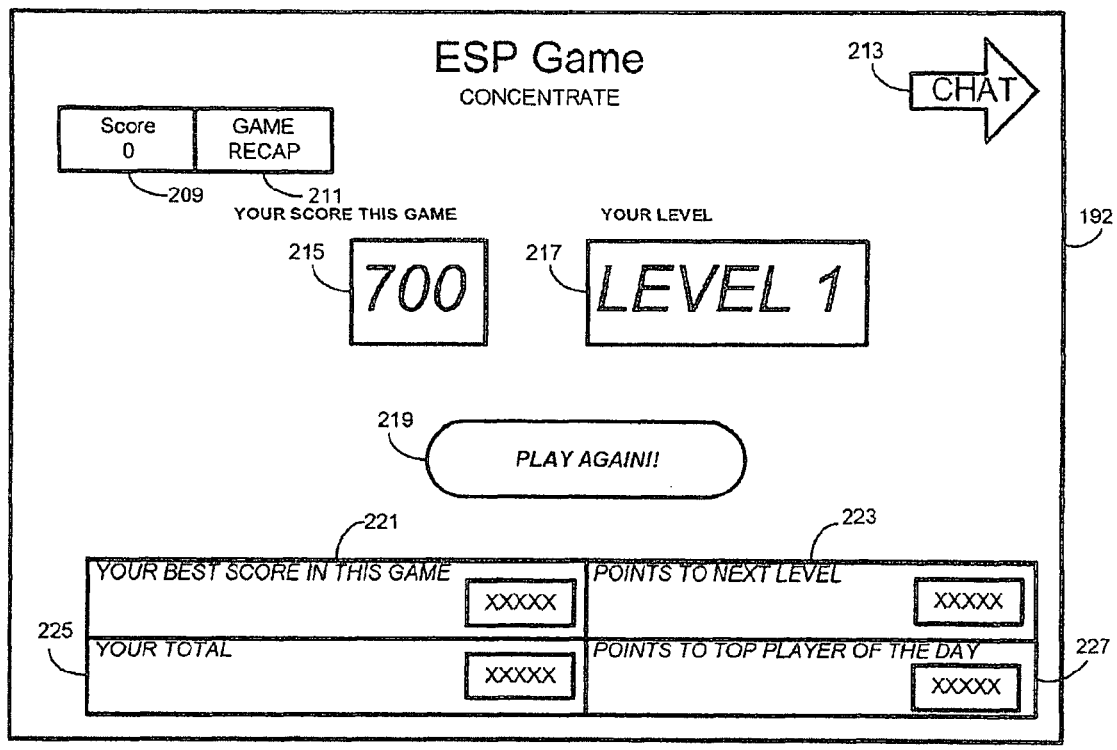

When the game time expires, the players may be shown a recap of the game. Referring to FIG. 6(E), the recap may include a score for a round 209, an overall score 215, and an associated level 217. The player may also view options such as their best score in the game 221, the number of points needed to reach the next level 223, their total number of points 225, and the points needed to reach the score of the top player of the day 227. A link to chat functionality 213 may be provided, and players may be allowed to play again by clicking a play button 219.

Figure 7:
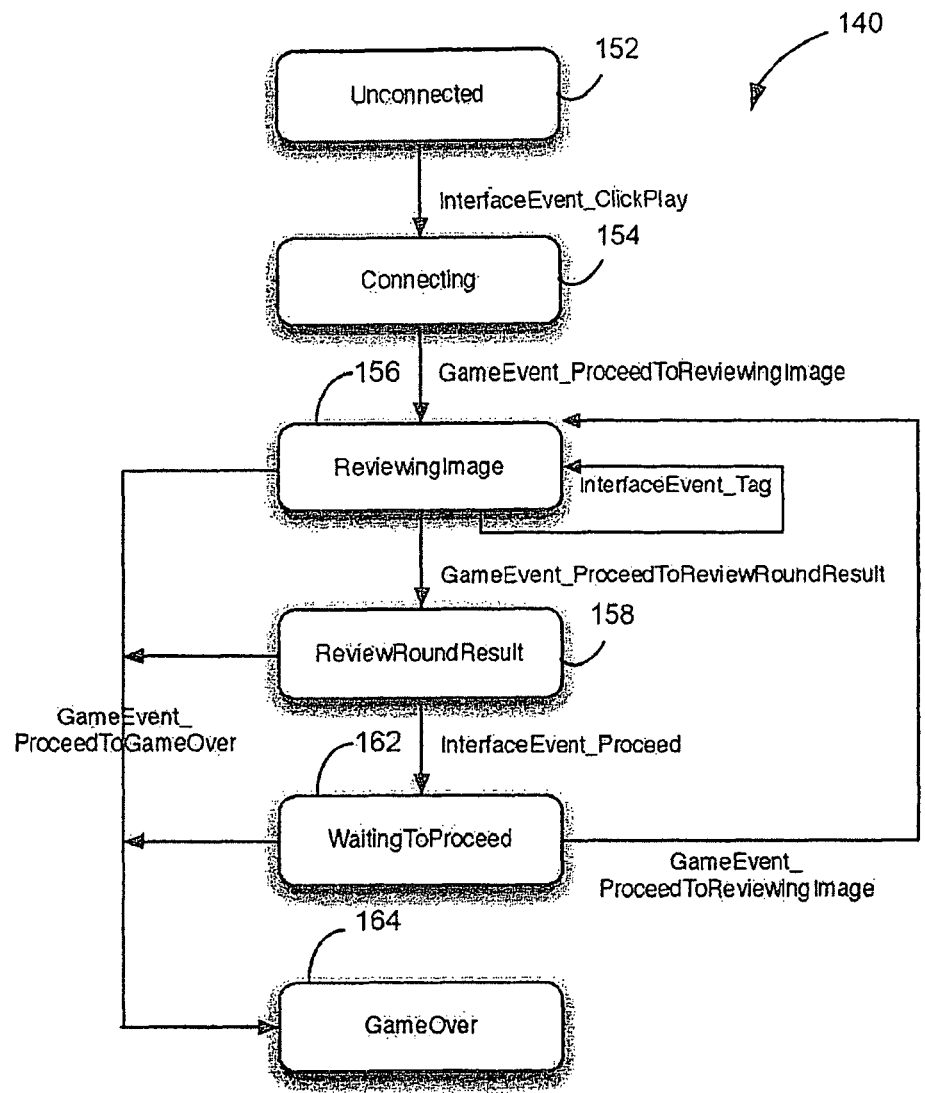
FIG. 7 illustrates an exemplary player state diagram that may be employed in the arrangement for building human computation games.

This user scenario can be represented by the player state diagram 140 of FIG. 7, where the rectangles represent player states and associated with the arrows are events that cause transitions between player states. A first player state is when all players are unconnected (state 152). Upon the event InterfaceEvent_ClickPlay, players connect to each other and to the back-end server (state 154). A next transition is when the players review an image, indicated by GameEvent_ProceedToReviewingImage, and the corresponding player state is ReviewingImage (state 156).

Upon a transition where the players provide the same tag or keyword to an image, the state transitions using GameEvent_ProceedToReviewRoundResult, with an ensuing post-transition state ReviewRoundResult (state 158). Depending on user input, the system may transition to GameOver (state 164) or to a state of WaitingToProceed (state 162), which then continues to the ReviewingImage state (state 156).

The corresponding HCXML file is shown in FIG. 8. Generally, the schema may provide support for specifying the user interface components that are associated with each player state. Each player state is associated with a display attribute, which specifies a user interface component. Where Silverlight is employed, the same specifies which Silverlight panel is associated with each display attribute, e.g., PreGamePanel, GamePanel or PostGamePanel. The front-end component 68; (see FIG. 3), in turn, may provide a mechanism for updating the correct interface panel depending on the current player state.

In the case of the ESP game, the PreGamePanel associated with the ClickPlay InterfaceEvent is illustrated by section 178 of the file 150. The PreGamePanel associated with the Connecting state is illustrated by section 176. The GamePanel associated with the ReviewingImage state is illustrated by section 174. The GamePanel associated with the ReviewRoundResult state is illustrated by section 172. The GamePanel associated with the WaitingToProceed state is illustrated by section 168, and the PostGamePanel associated with the GameOver state is illustrated by section 166.

Figure 9:
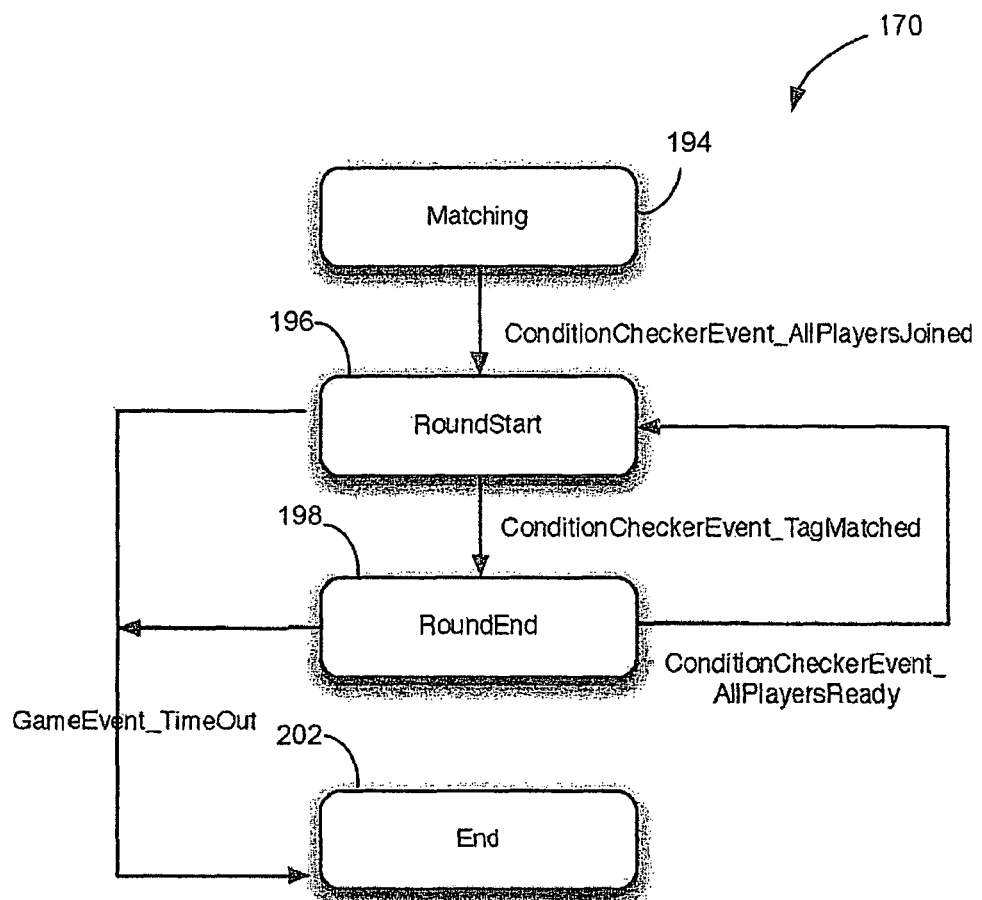
FIG. 9 illustrates an exemplary game states diagram that may be employed in the arrangement for building human computation games.

The game-state diagram of the ESP game is shown in FIG. 9, and the game's HCXML representation is shown in FIG. 10. There are several synchronization points in the ESP game that are specified in the game-state diagram 170 of FIG. 9. Each state in the game state machine is a synchronization point for players. For example, the first synchronization point occurs when all players have clicked the play button (state 194) and the game automatically moves all players to the first round of the game. In the finite state machine language, this is equivalent to the condition that all players are in the Connecting state, at which point the game state machine transitions to the RoundStart game state (state 196). Upon entering that state, all player states are transitioned to Playing, which, on the front-end component 68,, corresponds to a new round of the game. Upon all players choosing a common keyword (ConditionCheckerEvent_TagMatched), a transition is made to the RoundEnd state (state 198). At this point the game may finish by transitioning to End (state 202) or by players giving an indication that they desire to play again (e.g., the condition ConditionCheckerEvent_AllPlayersReady is met), at which point the flow may begin again at the RoundStart state (state 196).

The game state's HCXML representation 180 is shown in FIG. 10, which includes the states mentioned in FIG. 9, i.e., the matching state (section 212), the RoundStart state (section 208), the RoundEnd state (section 206), and the End state (section 204).

Figures 11A, 11B, 11C:
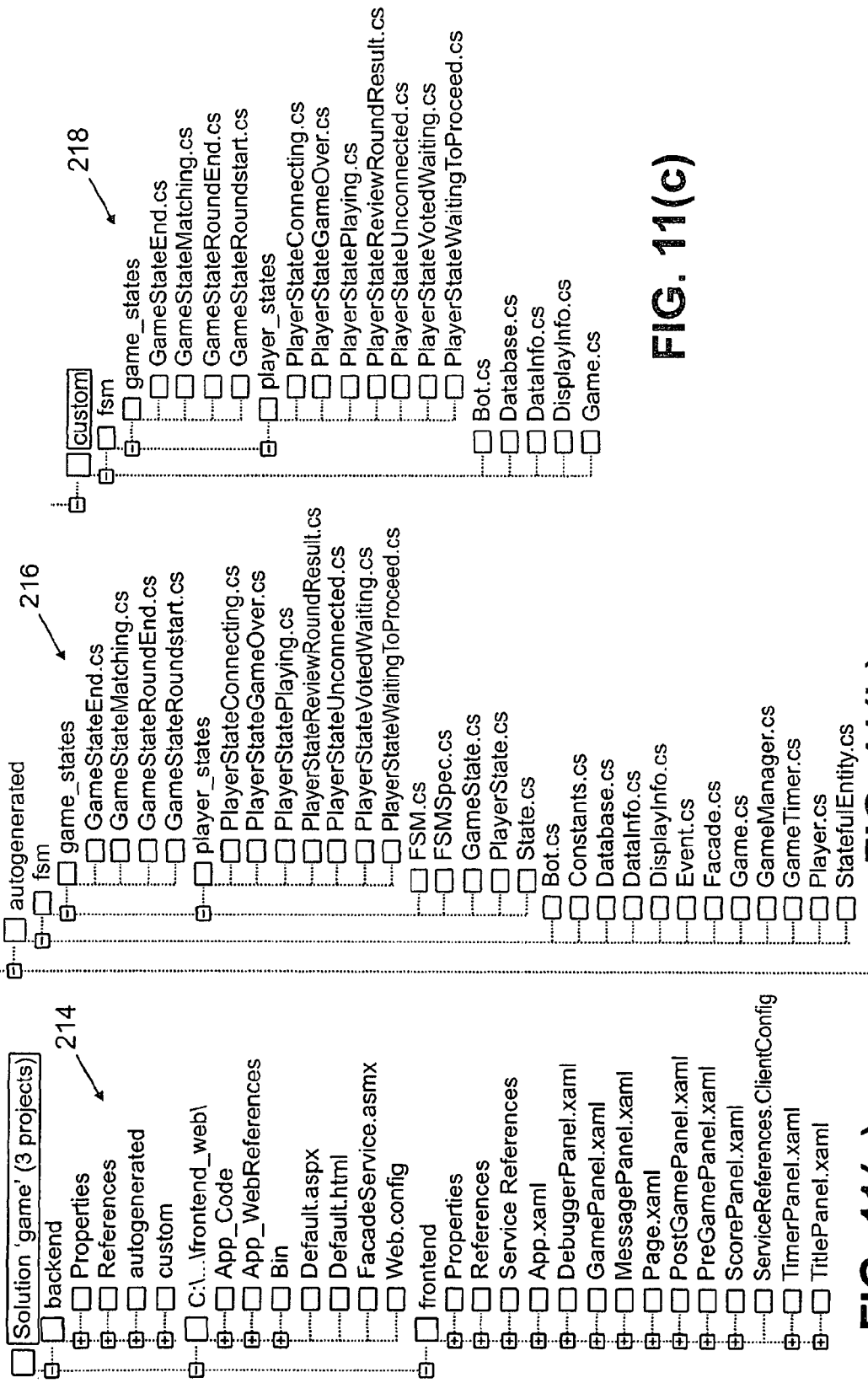
FIGS. 11(A)-(C) illustrate an exemplary code base generated by a generator module.

FIGS. 11(A)-(C) illustrate the result of the game-generation tool. In particular, referring to FIG. 11(A), given the HCXML file, the human-computation game-generation tool generates a working code base for the corresponding game. Upon running the game generation tool, a solution 214, e.g., in Visual Studio, may be created automatically, containing a back end project 215, e.g., in C#, a front end project 217, e.g., in Silverlight, and a website 231. These projects may be readily compilable and runnable.

The generator component may be robust to changes in the HCXML file. If there are changes to the HCXML file and the game-engine code requires regeneration, the generator component may only modify the auto-generated code, leaving any custom code that the user has already written intact. The generator component may follow two additional design principles: generality and modularity. In this way, the game engine is designed to be able to represent most or all classes of human-computation games. Code that can be shared across all games, e.g., database access, bot support, and partner matching, is automatically generated. Any game-specific elements, such as game states, player states, events, specific database and game information, may be generated from what is specified in the HCXML file.

The game-engine code is designed to be modular. Referring to FIG. 11(B), each game state and player state specified in the HCXML file becomes a separate class in the game engine. These may be seen by the classes listed in the game states folder 219 and in the player states folder 221. The generated code for the player states and game states (221 and 219, respectively) handles transitions automatically, allowing users to concentrate only on the custom code for processing a particular event. Provision is made for bot elements in the autogenerated code (element 223), as well for the database described above and below (element 225).

Referring to FIGS. 11(B) and 11(C), another feature of the game-generation tool is that code 216 that is autogenerated is separated into a different folder than code 218 that is customizable by a user. In this way, the user of the arrangement may then only modify code within the custom folder and inside code stubs that are already pre-generated using the game engine. The custom code 218 may also include game states 227 and player states 229 that are game specific and are modifiable by the user.

Referring to FIG. 12(A)-(C), the game generation tool provides database support. Upon specifying a database, e.g., a name, a user name and a password, in the HCXML file, the game generation tool may automatically create at least three tables in that database—queries 222, rounds 224, and recordings 226.

The queries table 222 contains the queries to be served to the players during each round of the game. These queries can be names of images, questions, music file names, etc. Each query may be associated with a difficulty level. The game engine code may provide mechanisms for balancing the difficulty level during the game, so that the game may be consistently challenging to the player.

The recordings table 226 is where any player actions during the game are recorded. The field action_type is the name of the InterfaceEvent sent by the player while performing an action on the front-end component, whereas the field action_value can contain information specific to that event. For example, if the event is to provide a keyword or tag for an image, i.e., InterfaceEvent_TagImage, then the action_value might be the tag that the player typed for that image. The field time_elapsed is the number of seconds that have passed since the beginning of the current round at which time the action is performed.

The generator component may provide a simple bot as part of the autogenerated code base (see, e.g., element 223 of FIG. 11(B)). The bot may retrieve a previously-recorded round and the associated player actions in that round, and replays those actions in the game in place of a human player. It is noted that a simple "replay bot" may not be appropriate for all games, but a significant number of existing games can leverage this functionality. If a player has waited to be matched for a time period exceeding a pre-specified threshold, the game engine may automatically match him with a bot. Users can decide whether to record a round or not by modifying a provided function within the game engine code. For example, the designer might choose to not record bot rounds, rounds that are incomplete, or rounds where players have entered inappropriate words.

Figure 13A:
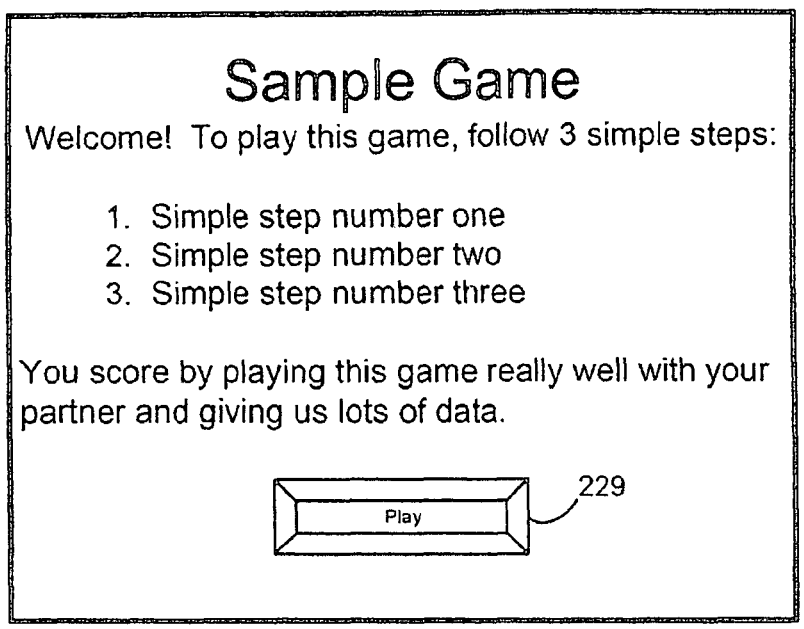
FIGS. 13(A)-(B) illustrate another partial set of exemplary screenshots, e.g., player states, that may be encountered by a user playing a human computation game. These screenshots indicate interface templates that may be provided by the generated game engine code.
Figure 13B:
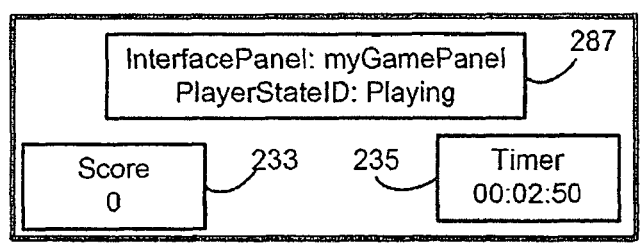

Referring to FIGS. 13(A) and 13(B), the front end project of the game engine may provide a set of general user interface templates, e.g., template 228, which may be immediately functional and easily customizable. The template may generally provide a play button 229 to allow access to the game. As shown in panel 232 in FIG. 13(B), a score display 233 and a time display 235 may be provided, as well as a debug panel 287, so that the current state of the game, as it is executing, can be monitored.

Each interface component may be, e.g., a Silverlight user control including (1) a file, e.g., an MXML file, that controls the interface look-and-feel and (2) a file, e.g., a C# file, that controls the interface logic. The interface may then be easily customizable by modifying the MXML file in its raw format or by a separate application, e.g., the well-integrated Expression Studio® plugin that is provided within Visual Studio®.

Human-computation games can be built to collect useful labeled data for a wide variety of problems, especially in the area of searching. Four examples (FIGS. 14-17) are now provided, as well as the games that have been built using the arrangements described above.

Example 1

There has been a substantial amount of work in the area of attempting to classify the intent of a query. For example, a query about a movie title may pertain to the movie show time, the movie DVD, a movie rental, a review, and the like. These may all be about the movie, but the user intention may be quite different. Knowing the intention of the user enables using a vertical search engine that can give the search query special treatment. Certain of the games designed build a query-intention classifier, and the game thus generates the appropriate human-labeled data.

Figure 14:
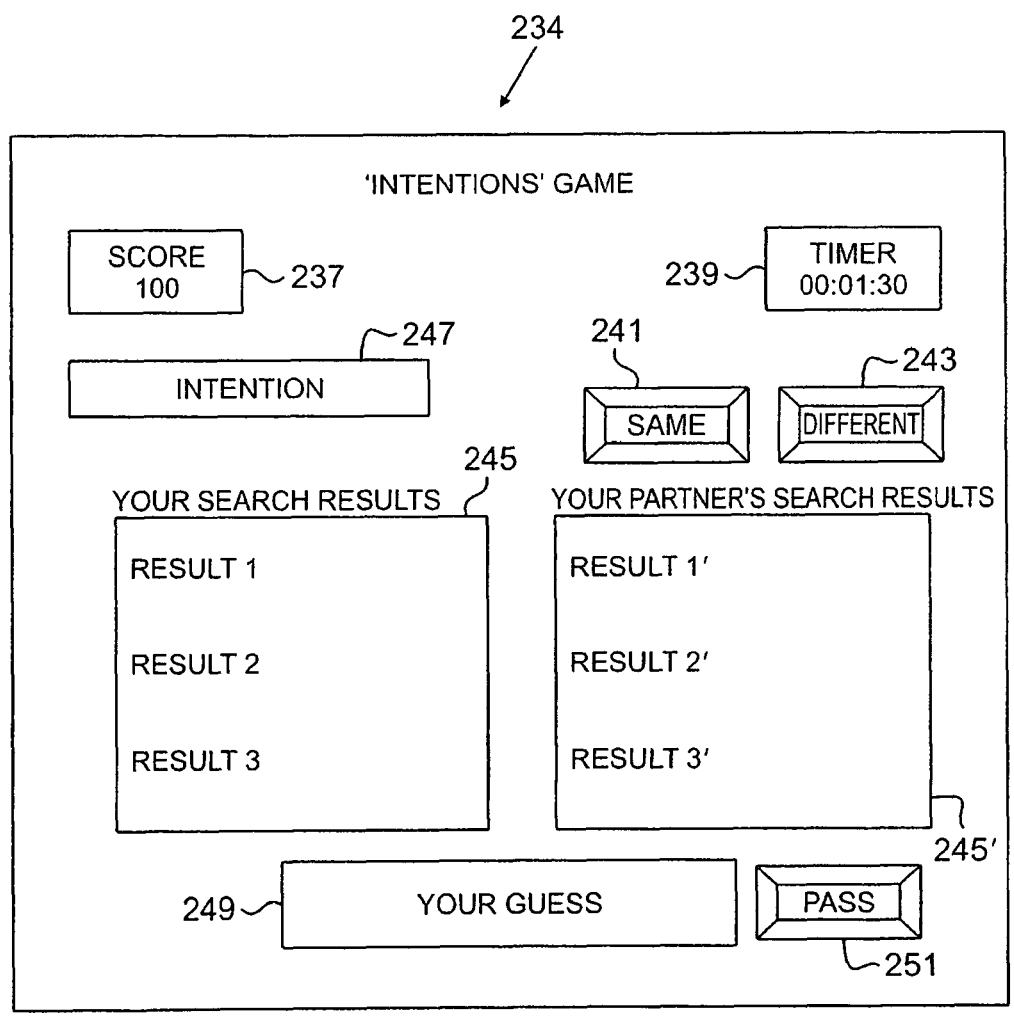
FIG. 14 illustrates another exemplary screenshot for a human computation game, this game for classifying the intentions of queries.

Referring to FIG. 14, a prototype game was built for collecting data that provides information about which search queries are associated with which intentions. In particular, the game presents players with a given intention, and elicits different ways a user might enter search queries to find answers to fulfill this intention. For example, the intention might be to purchase an inexpensive camera from a given manufacturer. The search queries might concern inexpensive cameras from that manufacturer, the camera model, or the like. For each intention, the game collects a set of associated search queries. From this data, one can extrapolate keywords or grammatical structures that are associated with different intentions.

One version of this game, illustrated by an interface 234, involves two players, where each player is given the description 247 of an intention, and the player's goal is to determine whether his partner has been given the same intention or a different intention. The players enter any number of search queries in a field 249 (with submit button 251) that potentially retrieve answers for their intended question. The player retrieves search results 245 and their partner retrieves search results 245'. Upon seeing each other's search results, the players decide whether they are given the same intention or different intentions, and indicate their decision using button 241 or button 243. In this way, the game transforms the original input of the user, a search query, into a different form (a set of search results), essentially preventing direct communication between the players. The prevention of direct communication means that players must discriminate between two sets of complex outputs, in this case search results, instead of more simplistic outputs, such as tags that are typed by the players. This additional discrimination task can potentially make the game more challenging and enjoyable. The player's score may be displayed in field 237 and a countdown timer 239 may also be provided.

Example 2

Another important problem in the field of search is to find alternate ways to reformulate a particular search query. The availability of this data allows search engines to suggest reformulations for search queries as well as to expand the search results to include all possible reformulations, given a search query.

Figure 15:
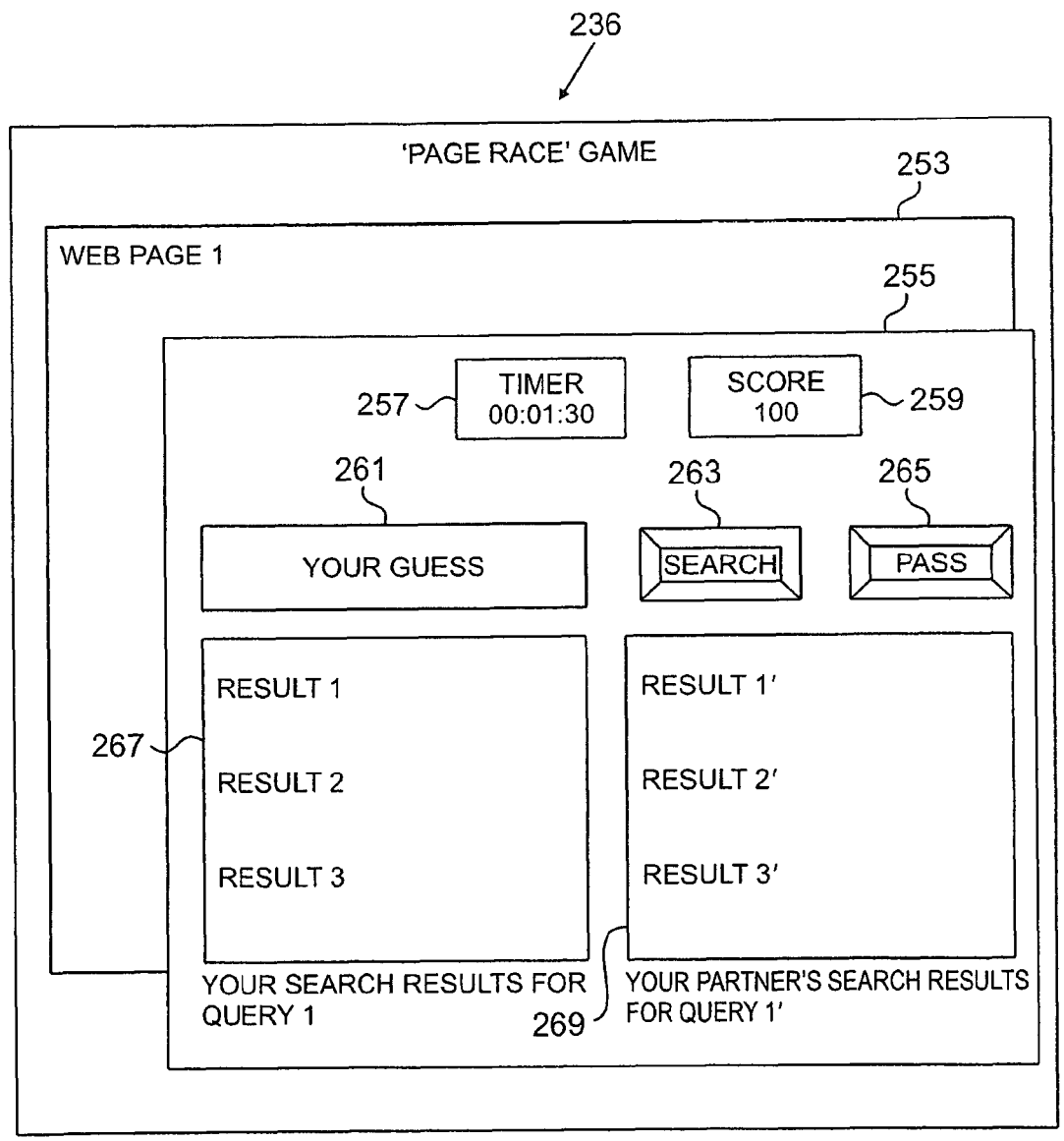
FIG. 15 illustrates another exemplary screenshot for a human computation game, this game for a reverse web search.

Referring to FIG. 15, a game interface 236 is illustrated for a game called "PageRace". PageRace is a game where two players are shown the same webpage 253 and are asked to enter a search query in a field 261 where the top search results contain the URL for that webpage. The player's search results for their query are shown in a window 267, while their partner's search results are shown by window 269. The player can test their guesses entered in field 261 by clicking a search button 263, or can move to the next web page by clicking a pass button 265. A timer display 257 may be provided, as well as a score display 259. The game is a race between two players, i.e. the person who accomplishes this task faster wins the round.

Example 3

Figure 16:
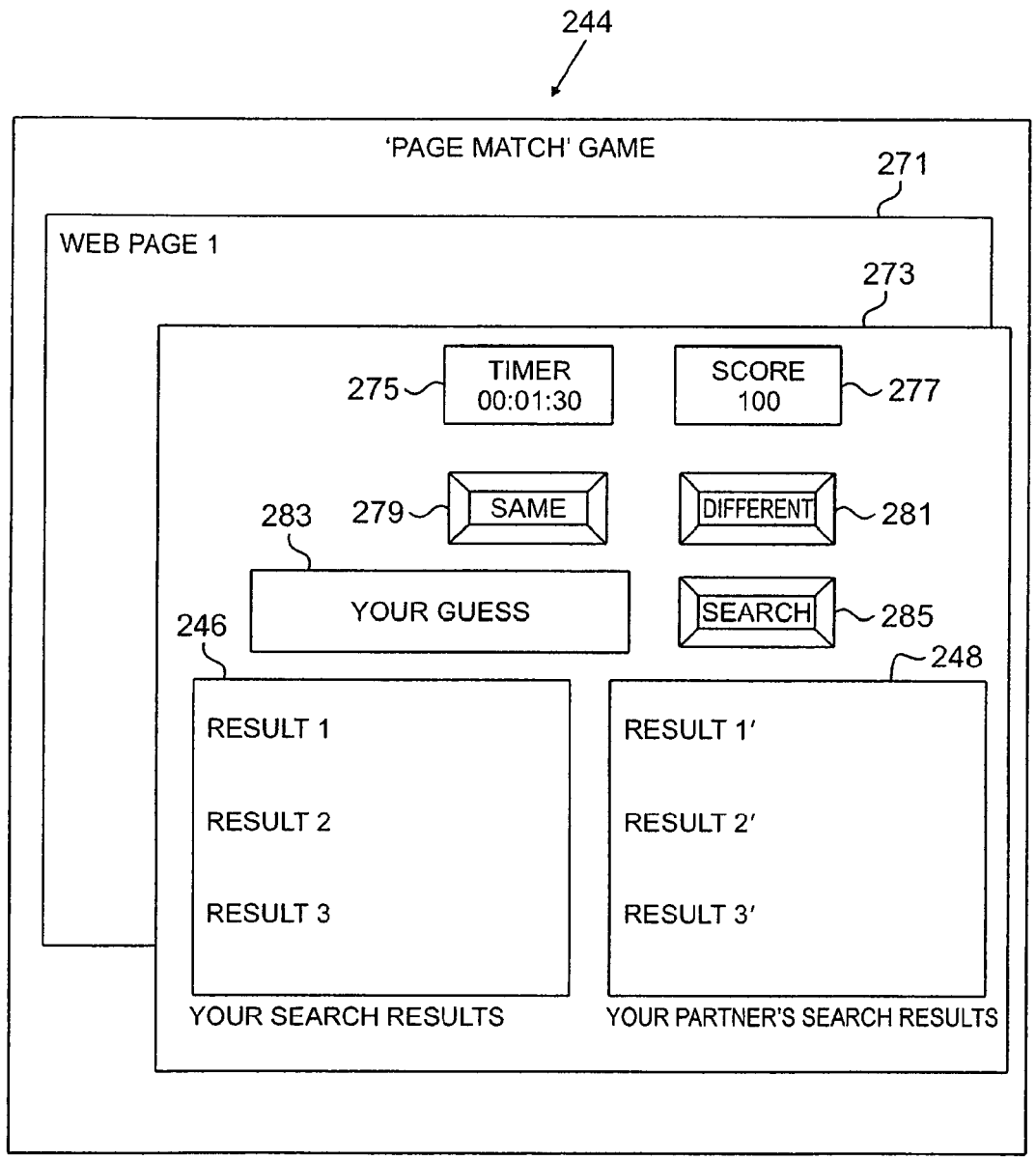
FIG. 16 illustrates another exemplary screenshot for a human computation game, this game also for a reverse web search.
Figure 17:
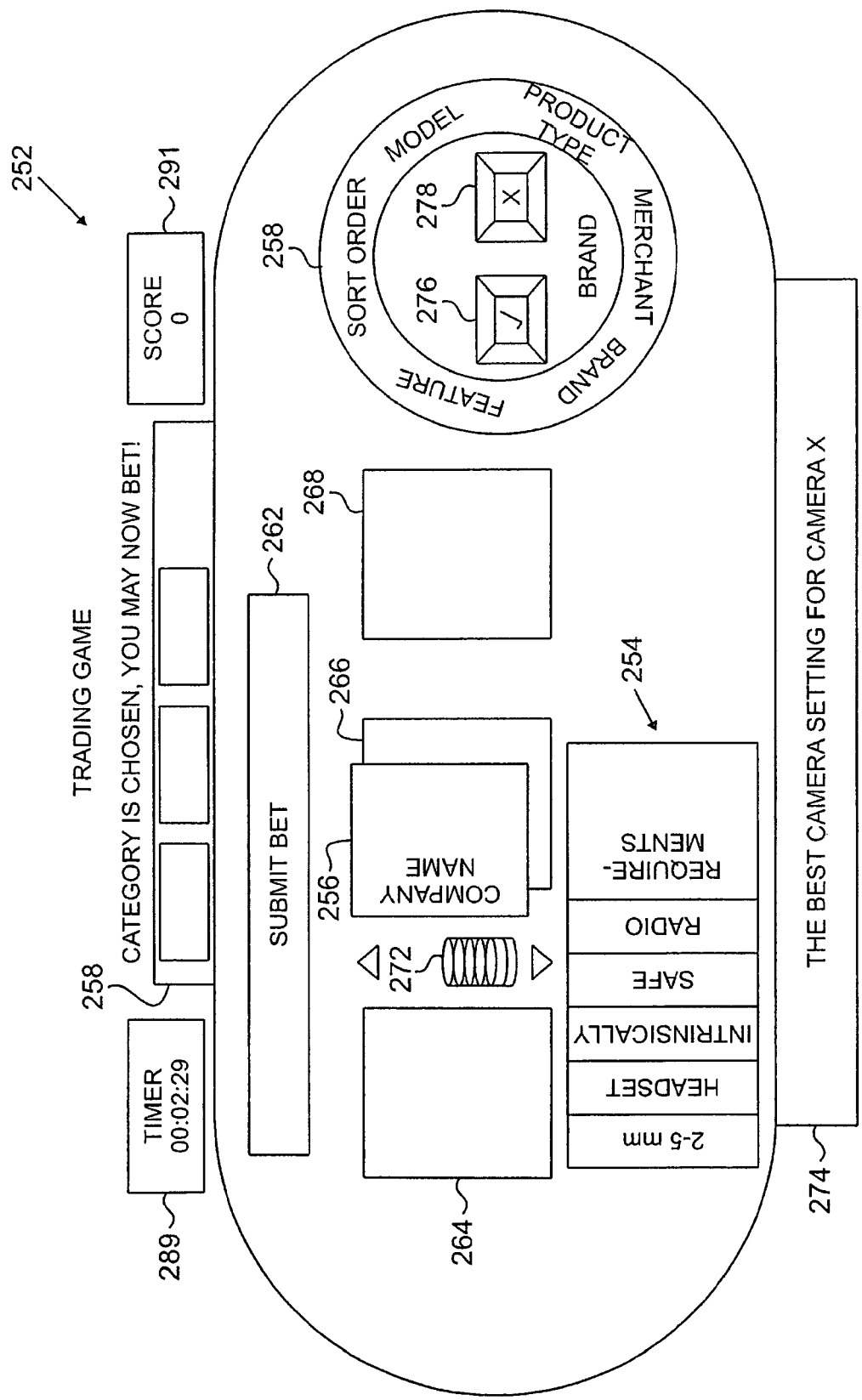
FIG. 17 illustrates another exemplary screenshot for a human computation game, this game a trading game for category or entity extraction in a search query.

Similar to the Intentions game, and as shown by the display 244 illustrated in FIG. 16, PageMatch is a game where two players are either shown the same webpage 271 or different webpages. In a window 274, the players enter search queries in a field 283, and by clicking a search button 285, that can potentially retrieve the page they are viewing. The player views their own search results in window 246 and their partner's results in window 248. Upon viewing each other's search results, the players decide whether they are given the same webpage, indicated by clicking button 279, or different webpages, indicated by clicking button 281. A timer display 275 may be provided, as well as a score display 277.

As an example of the usefulness of HCXML and HCGen, with developers familiar with the schema and generator component, the building of PageRace and PageMatch took roughly one day. This is in stark contrast to the amount of time it generally takes to make a fully functioning prototype game.

Example 4

Besides the intention of a query, the arrangement also provides a way to predict labels for the individual tokens in a query. For example, given a query such as "cameras of a given model from a given manufacturer that fit into a pocket", certain parameters may be useful to know for performing a search, such as which term is the brand name, which is the model name, which is the product type, and that "fits into a pocket" is a product feature. Knowing such information allows the search engine to pinpoint more specifically relevant pages that may be of interest to users.

Labeling entities in text is normally an onerous task. Yet, such data may be valuable for search functionality as well as for natural language processing research. Using the arrangement, a trading game was built for extracting entities from search queries. This game is illustrated by the game interface 252 displayed in FIG. 17. A query 274 is provided, and each of two players receives a set of term cards 254.

The game involves two players. The player's task is to trade term cards with his partner until his goal, i.e., the search query, is satisfied. By spinning the wheel 258, an entity is chosen, which a player can accept (button 276) or reject (button 278). The players may drag-and-drop term cards 254, in which card 256 is an example, to placement locations 264, 266, and 268, the term cards chosen by the player and corresponding to the chosen entity. A provision may be made for betting on the likelihood of the accuracy of the chosen term card. Bets may be taken from a store 258 and placed in a betting location 272. Bets may be finalized by clicking on submit button 262. A timer display 289 may be provided, as well as a score display 291.

The game is a particularly complex human-computation game, both in terms of the rich interactivity on the front end (e.g. spinning a wheel, dragging and dropping cards) and the number of game and player states involved. Using the arrangement, however, all state transitions are automated, allowing a focus on the user experience and detailed game logic.

In summary, an arrangement for building human computations games, e.g., a Human Computation Toolkit, was described. The arrangement included a game description language and a game generation tool. Four prototype games were described that were built using the arrangement. The arrangements provide a way for human computation games to be quickly prototyped and tested, enhancing the ability to collect large amounts of labeled data within a short period of time.

Figure 18:
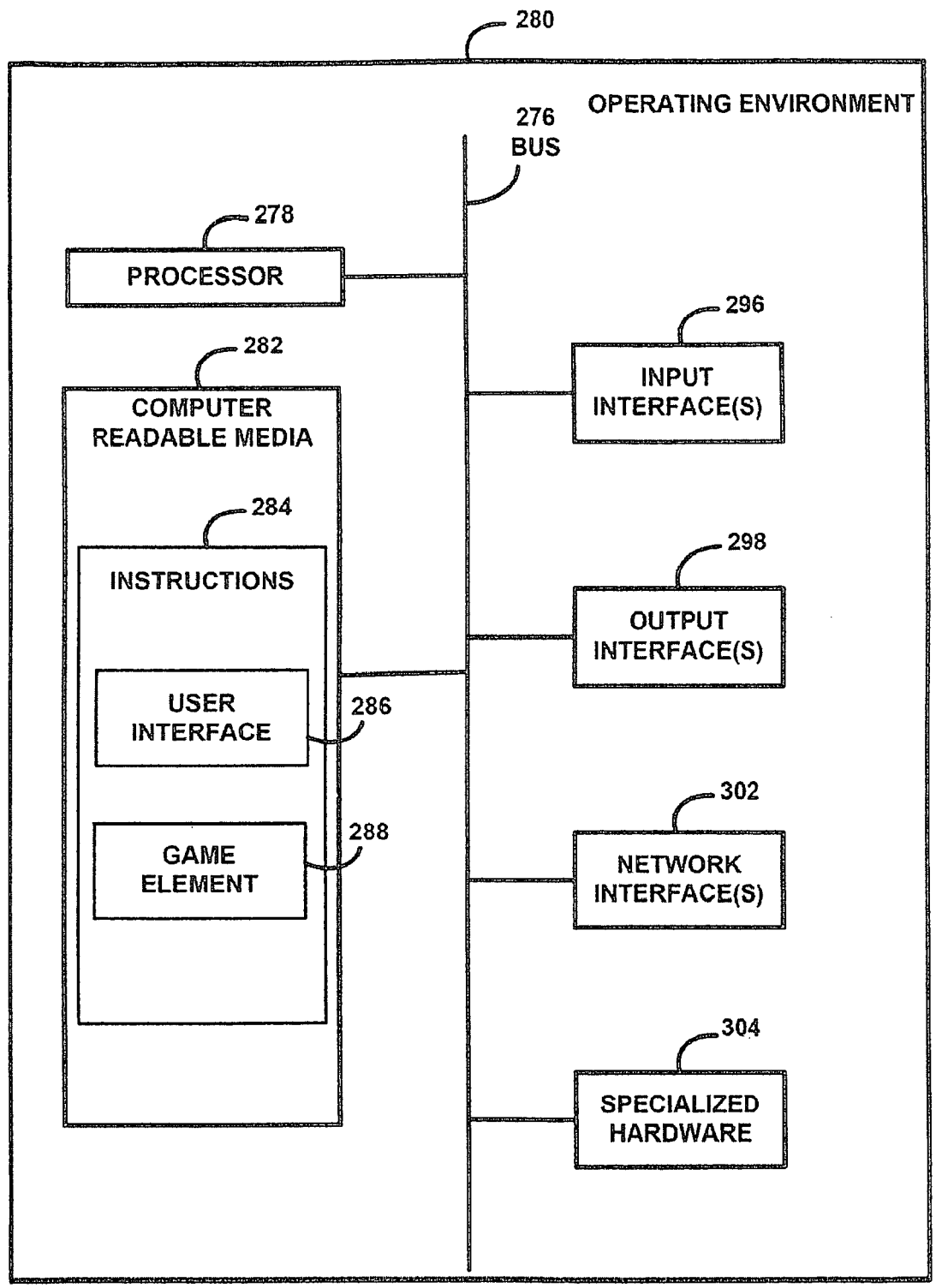
FIG. 18 is a simplified functional block diagram of an exemplary configuration of an operating environment in which the arrangement for building human computation games may be implemented or used.

FIG. 18 is a block diagram of an exemplary configuration of an operating environment 280 in which all or part of the arrangements and/or methods shown and discussed in connection with the figures may be implemented or used. For example, the operating environment may be employed in either the game server, the back-end server 58, or the front-end component 68; and the client systems 66$_i$, or in all of these. Operating environment 280 is generally indicative of a wide variety of general-purpose or special-purpose computing environments, and is not intended to suggest any limitation as to the scope of use or functionality of the arrangements described herein.

As shown, operating environment 280 includes processor 278, computer-readable media 282, and computer-executable instructions 284. One or more internal buses 276 may be used to carry data, addresses, control signals, and other information within, to, or from operating environment 280 or elements thereof.

Processor 278, which may be a real or a virtual processor, controls functions of the operating environment by executing computer-executable instructions 284. The processor may execute instructions at the assembly, compiled, or machine-level to perform a particular process.

Computer-readable media 282 may represent any number and combination of local or remote devices, in any form, now known or later developed, capable of recording, storing, or transmitting computer-readable data, such as computer-executable instructions 284 which may in turn include user interface functions 286 and game element functions 288. In particular, the computer-readable media 282 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 284 represent any signal processing methods or stored instructions. Generally, computer-executable instructions 284 are implemented as software components according to well-known practices for component-based software development, and are encoded in computer-readable media. Computer programs may be combined or distributed in various ways. Computer-executable instructions 284, however, are not limited to implementation by any specific embodiments of computer programs, and in other instances may be implemented by, or executed in, hardware, software, firmware, or any combination thereof.

Input interface(s) 296 are any now-known or later-developed physical or logical elements that facilitate receipt of input to operating environment 280.

Output interface(s) 298 are any now-known or later-developed physical or logical elements that facilitate provisioning of output from operating environment 280.

Network interface(s) 302 represent one or more physical or logical elements, such as connectivity devices or computer-executable instructions, which enable communication between operating environment 280 and external devices or services, via one or more protocols or techniques. Such communication may be, but is not necessarily, client-server type communication or peer-to-peer communication. Information received at a given network interface may traverse one or more layers of a communication protocol stack.

Specialized hardware 304 represents any hardware or firmware that implements functions of operating environment 280. Examples of specialized hardware include encoders/decoders, decrypters, application-specific integrated circuits, clocks, and the like.

The methods shown and described above may be implemented in one or more general, multi-purpose, or single-purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers. The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method of constructing human computation web-based games, comprising:
   creating a markup language schema that includes a game states element that describes the states and synchronization points of a multi-player game and that specifies a game state machine, the game state machine including a set of game states that each correspond to a union of all players' states and to a set of events that causes transitions between game states, the game states machine being usable to synchronize players' actions;
   analyzing the created markup language schema; and
   generating code based on results of the analyzing.

2. The method of claim 1, wherein the schema includes a bot element that is employable as an opponent against a human player in a human computation game.

3. The method of claim 1, in which the markup language schema further includes a game element, the game element including a number of players element, a game time element, a player states element, and the game states element.

4. The method of claim 3, in which the game element further includes a database element.

5. The method of claim 3, in which the player states element includes a set of player states and a set of transitions between player states.

6. The method of claim 1, in which the game states element includes a set of game states representing different phases of the game and a set of events that cause transitions between game states.

7. The method of claim 6, in which each different phase corresponds to a union of all players' states allowed in the phase.

8. The method of claim 1, in which the markup language is implemented in XML.

9. A system for constructing human computation web-based games, the system comprising a memory device and one or more processors to execute instructions stored in the memory device to:
   create a markup language schema that includes a game states element that describes the states and synchronization points of a multi-player game and that specifies a game state machine, the game state machine including a set of game states that each correspond to a union of all players' states and to a set of events that causes transitions between game states, the game states machine being usable to synchronize players' actions;
   analyze the created markup language schema; and
   generate code based on a result of analysis of the created markup language schema.

10. The system of claim 9, wherein the schema includes a bot element that is employable as an opponent against a human player in a human computation game.

11. The system of claim 9, wherein the markup language schema further includes a game element, the game element including a number of players element, a game time element, a player states element, and the game states element.

12. The system of claim 11, wherein the game element further includes a database element.

13. The system of claim 11, wherein the player states element includes a set of player states and a set of transitions between player states.

14. The system of claim 9, wherein the game states element includes a set of game states representing different phases of the game and a set of events that cause transitions between game states.

15. The system of claim 14, wherein each different phase corresponds to a union of all players' states allowed in the phase.

16. The system of claim 9, wherein the markup language is implementable in XML.

* * * * *